(12) United States Patent
Agrawal et al.

(10) Patent No.: US 12,112,127 B2
(45) Date of Patent: Oct. 8, 2024

(54) SYSTEMS AND METHODS FOR GENERATING A CUSTOMIZED GRAPHICAL USER INTERFACE

(71) Applicant: Walmart Apollo, LLC, Bentonville, AR (US)

(72) Inventors: Neeraj Agrawal, Agra (IN); Priyanka Bhatt, Faridabad (IN); Tanishka Agarwal, Greater Noida (IN)

(73) Assignee: WALMART APOLLO, LLC, Bentonville, AR (US)

( * ) Notice: Subject to any disclaimer, the term of this patent is extended or adjusted under 35 U.S.C. 154(b) by 452 days.

(21) Appl. No.: 17/589,143

(22) Filed: Jan. 31, 2022

(65) Prior Publication Data

US 2023/0244866 A1 Aug. 3, 2023

(51) Int. Cl.
*G06F 40/30* (2020.01)
*G06F 3/0484* (2022.01)
(Continued)

(52) U.S. Cl.
CPC ............ *G06F 40/20* (2020.01); *G06F 3/0484* (2013.01); *G06F 40/35* (2020.01); *G06N 3/08* (2013.01); *G06Q 10/0837* (2013.01)

(58) Field of Classification Search
CPC .... G06F 40/211; G06F 40/253; G06F 40/268; G06F 40/284; G06F 40/30; G06N 3/08; G10L 15/00
See application file for complete search history.

(56) References Cited

U.S. PATENT DOCUMENTS 10,606,952 B2 * 3/2020 Ferrucci ............... G06F 40/30
11,763,100 B2 * 9/2023 Xu .......................... G06N 3/044
704/9

(Continued)

FOREIGN PATENT DOCUMENTS

CN 112597310 4/2021
CN 113064992 7/2021
(Continued)

*Primary Examiner* — Lamont M Spooner
(74) *Attorney, Agent, or Firm* — BRYAN CAVE LEIGHTON PAISNER LLP

(57) ABSTRACT

Systems and methods including one or more processors and one or more non-transitory storage devices storing computing instructions configured to run on the one or more processors and cause the one or more processors to perform receiving one or more user utterances; re-training a pre-trained natural language processing (NLP) algorithm on the one or more user utterances; using the pre-trained NLP algorithm, as re-trained, as one or more layers in a neural network; combining at least one first output of at least one first output layer of the neural network with at least one second output of at least one second output layer of the neural network to create a final output of the neural network, wherein: the at least one first output layer of the neural network is different than the at least one second output layer of the neural network; and wherein the pre-trained NLP algorithm, as re-trained, is used to determine the final output of the neural network; and coordinating displaying a customized graphical user interface (GUI) using the final output of the neural network. Other embodiments are disclosed herein.

20 Claims, 6 Drawing Sheets

(51) Int. Cl.
   *G06F 40/20* (2020.01)
   *G06F 40/35* (2020.01)
   *G06N 3/08* (2023.01)
   *G06Q 10/0837* (2023.01)

(56) References Cited

U.S. PATENT DOCUMENTS

| | | | | |
|---|---|---|---|---|
| 11,816,533 | B2* | 11/2023 | Ren | G06N 5/042 |
| 11,947,908 | B2* | 4/2024 | Ren | G06F 40/279 |
| 2020/0218502 | A1* | 7/2020 | Andersen | G06F 3/0481 |
| 2021/0141863 | A1* | 5/2021 | Wu | G06N 3/08 |
| 2021/0295203 | A1* | 9/2021 | Liao | G06N 3/006 |
| 2022/0043975 | A1* | 2/2022 | Li | G06N 3/047 |
| 2022/0188661 | A1* | 6/2022 | Tappin | G06F 16/248 |
| 2022/0197306 | A1* | 6/2022 | Cella | G06N 3/088 |
| 2022/0277142 | A1* | 9/2022 | Mohan | G06F 16/3329 |
| 2022/0277143 | A1* | 9/2022 | Jayarao | G06F 40/295 |
| 2022/0335216 | A1* | 10/2022 | Ren | G06F 40/279 |
| 2022/0357733 | A1* | 11/2022 | Crane | G05B 23/0281 |
| 2022/0357940 | A1* | 11/2022 | Crane | G06F 11/3089 |
| 2022/0383084 | A1* | 12/2022 | Lamy-Poirier | G06N 3/063 |
| 2022/0414684 | A1* | 12/2022 | Le | G06N 3/045 |
| 2023/0031152 | A1* | 2/2023 | Bhaskaran | G06F 16/24578 |
| 2023/0106590 | A1* | 4/2023 | Di Fabbrizio | G06F 16/906 |
| | | | | 705/26.63 |
| 2023/0111047 | A1* | 4/2023 | Brin | G06F 18/40 |
| | | | | 706/12 |
| 2023/0111633 | A1* | 4/2023 | Paruchuri | G06T 13/40 |
| | | | | 705/26.7 |
| 2023/0394250 | A1* | 12/2023 | Puri | G06F 40/30 |

FOREIGN PATENT DOCUMENTS

| | | |
|---|---|---|
| CN | 113672726 | 11/2021 |
| WO | 2021118462 | 6/2021 |

* cited by examiner

SYSTEMS AND METHODS FOR GENERATING A CUSTOMIZED GRAPHICAL USER INTERFACE

TECHNICAL FIELD

This disclosure relates generally to customized graphical user interfaces (GUIs) and more particularly related to customized GUIs generated using predictive algorithms.

BACKGROUND

Graphical user interfaces ("GUIs") are integral to the operation of modern day computer systems. Before their creation, text based user interfaces ("TUIs") (e.g., MS-DOS, Unix, etc.) excluded a large population of non-technical users from operating computer terminals due to the complexity of operating TUIs. Non-technical users would need to memorize or consult a chart of clunky, text-based commands and laboriously enter these commands into the TUI in order to operate a computer terminal. This situation changed with the advent of early GUIs, which allowed a non-technical user to operate a computer terminal using a mouse and without text based commands.

Early GUIs, though, posed their own problems. Many times, commands a user wanted to execute were buried in the GUI within a sub-menu accessible only after repeated inputs into the GUI (e.g., a drop down menu, a different tab, a different screen of the GUI, etc.). This situation, then, lead to user frustration and the inability of the user to use these desired commands. One solution to this problem is to make every command accessible on a GUI without sub-menus, but this poses its own problems. For example, many modern computer systems simply have too many commands to display them all without sub-menus. Further, the advent of computing on mobile devices, many of which have small displays, has made this solution impractical or impossible.

More recently, predictive algorithms have been used to customize commands displayed on GUIs based on historical user activity. For example, many GUIs will consider historical usage patterns and display GUI elements for frequently used commands. This blunderbuss approach to GUI customization, though, does not consider an intent of a user to utilize a specific command during a specific usage session.

Therefore, in view of the above, there is a need for a GUI that considers an intent of a user when determining what icons or responses to display on a GUI.

BRIEF DESCRIPTION OF THE DRAWINGS

To facilitate further description of the embodiments, the following drawings are provided in which.

Figure 1:
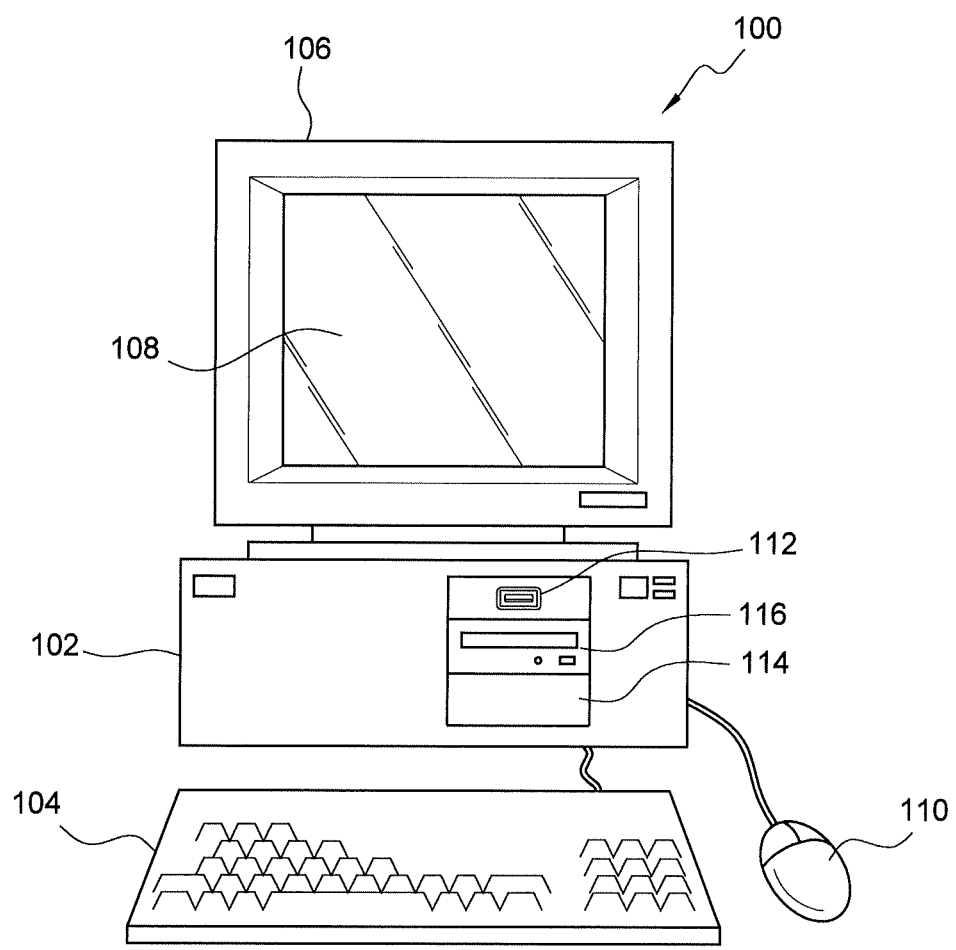
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform receiving one or more user utterances; re-training a pre-trained natural language processing (NLP) algorithm on the one or more user utterances; using the pre-trained NLP algorithm, as re-trained, as one or more layers in a neural network; combining at least one first output of at least one first output layer of the neural network with at least one second output of at least one second output layer of the neural network to create a final output of the neural network, wherein: the at least one first output layer of the neural network is different than the at least one second output layer of the neural network; and wherein the pre-trained NLP algorithm, as re-trained, is used to determine the final output of the neural network; and coordinating displaying a customized graphical user interface (GUI) using the final output of the neural network.

Various embodiments include a method. The method can be implemented via execution of computing instructions configured to run at one or more processors and configured to be stored at non-transitory computer-readable media The method can comprise receiving one or more user utterances; re-training a pre-trained natural language processing (NLP) algorithm on the one or more user utterances; using the pre-trained NLP algorithm, as re-trained, as one or more layers in a neural network; combining at least one first output of at least one first output layer of the neural network with at least one second output of at least one second output layer of the neural network to create a final output of the neural network, wherein: the at least one first output layer of the neural network is different than the at least one second output layer of the neural network; and wherein the pre-trained NLP algorithm, as re-trained, is used to determine the final output of the neural network; and coordinating displaying a customized graphical user interface (GUI) using the final output of the neural network.

Figure 2:
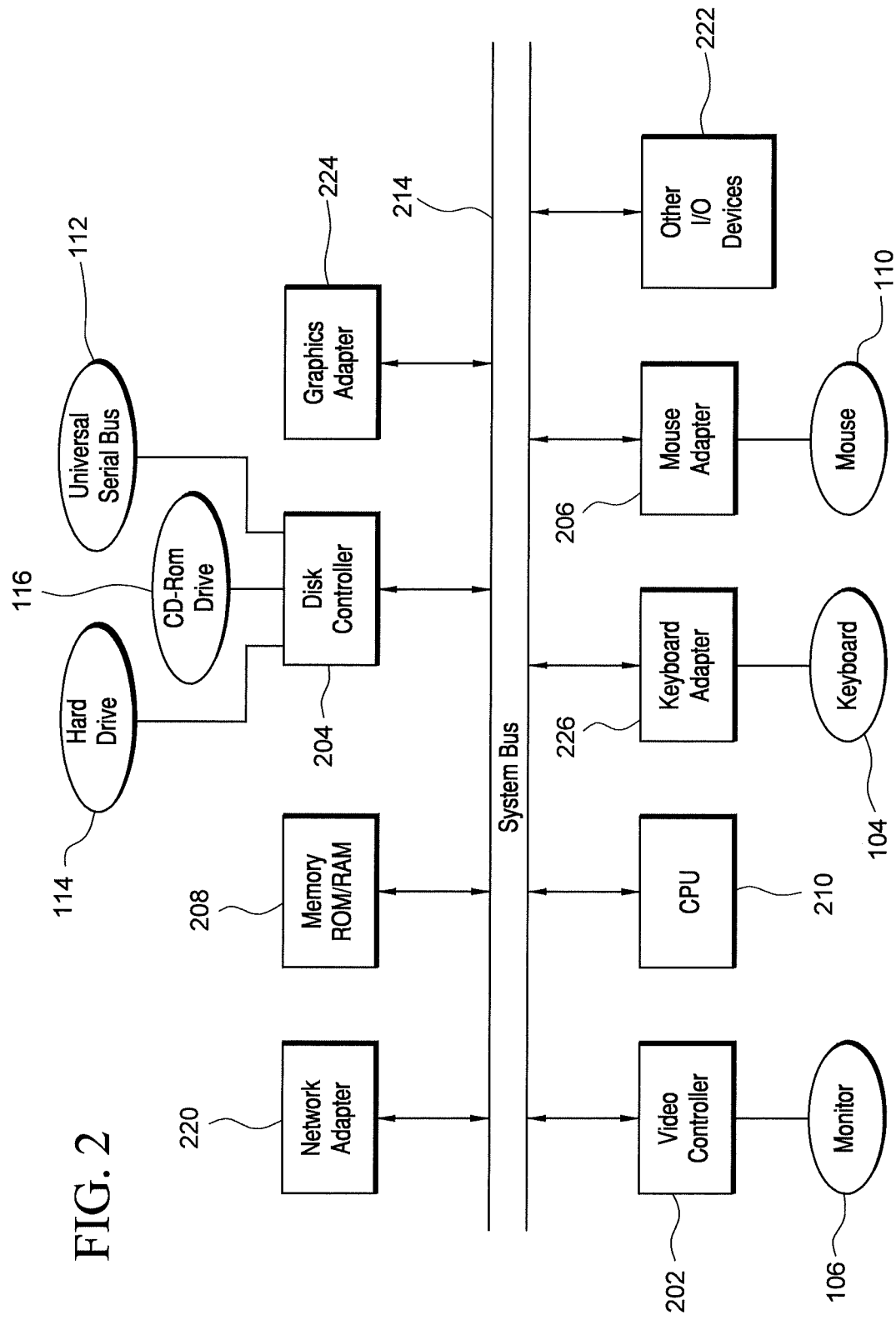
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM), electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
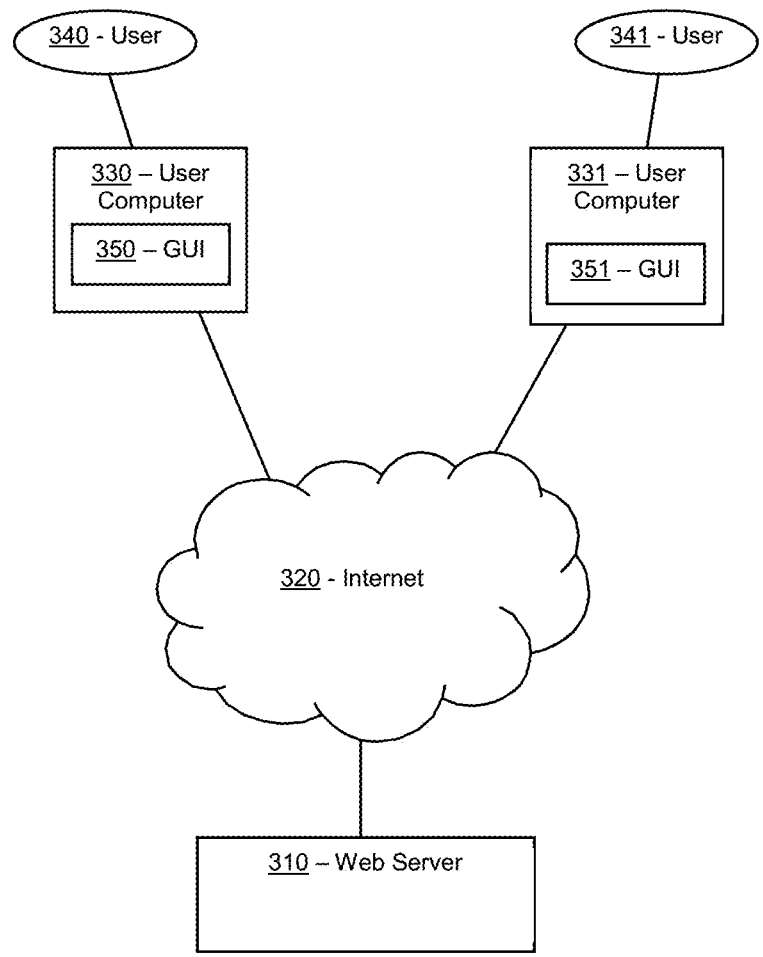
FIG. 3 illustrates a representative block diagram of a system, according to an embodiment.

Turning ahead in the drawings, FIG. 3 illustrates a block diagram of a system 300 that can be employed for generating a customized GUI, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310 and/or user computers 330, 331. Web server 310 and/or user computers 330, 331 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310 and/or user computers 330, 331. Additional details regarding web server 310 and/or user computers 330, 331 are described herein.

In many embodiments, system 300 can comprise user computers 330, 331. In other embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons. In various embodiments, user computers 330, 331 can comprise a display that is smaller than monitor 106 (FIG. 1), thereby facilitating mobility.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interface ("GUI") 350, 351. In the same or different embodiments, GUI 350, 351 can be part of and/or displayed by user computers 330, 331, which also can be part of system 300. In some embodiments, GUI 350, 351 can comprise text and/or graphics (image) based user interfaces. In the same or different embodiments, GUI 350, 351 can comprise a heads up display ("HUD"). When GUI 350, 351 comprises a HUD, GUI 350, 351 can be projected onto a medium (e.g., glass, plastic, etc.), displayed in midair as a hologram, or displayed on a display (e.g., monitor 106 (FIG. 1)). In various embodiments, GUI 350, 351 can be color, black and white, and/or greyscale. In many embodiments, GUI 350, 351 can comprise an application running on a computer system, such as computer system 100 (FIG. 1), user computers 330, 331, and/or web server 310. In the same or different embodiments, GUI 350, 351 can comprise a website accessed through Internet 320. In some embodiments, GUI 350, 351 can comprise an eCommerce website. In various embodiments GUI 350, 351 can comprise a chat bot, virtual assistant, and/or some other type of automated response system. In the same or different embodiments, GUI 350, 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 310 can be in data communication through Internet 320 with user computers 330, 351. In certain embodiments, user computers 330, 331 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310 and/or user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 310 and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310 and/or user computers 330, 331. In a similar manner, the processing module(s) and the memory storage module(s) can be local and/or remote to each other.

In many embodiments, web server 310 and/or user computers 330, 331 can be configured to communicate with one or more user computers 340 and 341. In some embodiments, user computers 340 and 341 also can be referred to as customer computers. In some embodiments, web server 310 and/or user computers 330, 331 can communicate or interface (e.g., interact) with one or more customer computers (e.g., user computers 330, 331) through a network or Internet 320. Internet 320 can be an intranet that is not open to the public. In further embodiments, Internet 320 can be a mesh network of individual systems. Accordingly, in many embodiments, web server 310 (and/or the software used by such systems) can refer to a back end of system 300 operated by an operator and/or administrator of system 300, and user computers 330, 331 (and/or the software used by such systems) can refer to a front end of system 300 used by one or more users 340, 341, respectively. In some embodiments, users 340, 341 can also be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or user computers 330, 331 also can be configured to communicate with one or more databases. The one or more databases can comprise a product database that contains information about products, items, or SKUs (stock keeping units) sold by a retailer. In many embodiments, one or more databases can comprise information about interactions of user computers 330, 331 with GUIs 350, 351. For example, the one or more databases can store past (e.g., historical) interactions of user computers 330, 331 with GUIs 350, 351. These interactions can be tied to a unique identifier (e.g., an IP address, an advertising ID, device ID, etc.) and/or a user account. In embodiments where a user 340, 341 interacts with GUIs 350, 351 before logging into a user account, data stored in the one or more database that is associated with a unique identifier can be merged with and/or associated with data associated with the user account. In some embodiments, data can be deleted from a database when it becomes older than a maximum age. In many embodiments, a maximum age can be determined by an administrator of system 300. In various embodiments, data collected in real-time can be streamed to a database for storage.

In many embodiments, one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s). In various embodiments, databases can be stored in a cache (e.g., MegaCache) for immediate retrieval on-demand.

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310 and/or user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for a more accurate algorithm for interpreting user utterances. These techniques described herein can provide a significant improvement over conventional approaches of interpreting short phrases, such as rules based algorithms. Moreover, these estimates are technical improvements over other possible approaches, such as non-hierarchical neural networks. In many embodiments, the techniques described herein can beneficially make determinations based on dynamic information that describes current intents of a user. In this way, the techniques described herein can avoid problems with stale and/or outdated machine learned models by continually updating.

In many embodiments, the techniques described herein can be used continuously at a scale that cannot be reasonably performed using manual techniques or the human mind. For example, training machine learning algorithms often requires volumes of training data beyond what can practically be handled by the human mind.

In a number of embodiments, the techniques described herein can solve a technical problem that arises only within the realm of computer networks, as customized graphical user interfaces do not exist outside the realm of computer networks.

In many embodiments, the techniques described herein can solve a technical problem cannot be solved outside the context of computer networks. Specifically, the techniques described herein cannot be used outside the context of computer networks due to a lack of data and because the machine learning model cannot be performed without a computer system and/or network.

Figure 4:
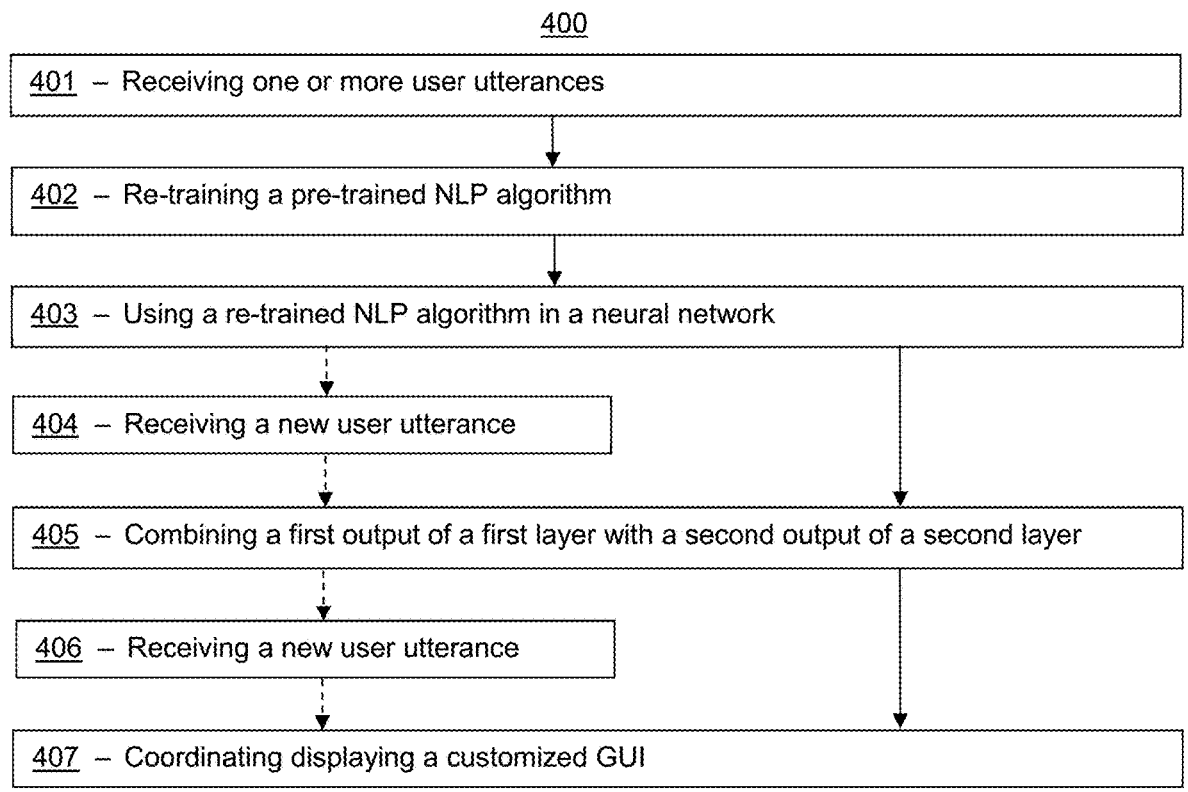
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 and/or user computers 330, 331 (FIG. 3). The processing module(s) can be similar or identical to the processing module(s) described above with respect to computer system 100 (FIG. 1).

In many embodiments, method 400 can comprise an activity 401 of receiving one or more user utterances. In some embodiments, a user utterance can comprise natural language of a user. In these or other embodiments, a user utterance can contain one or more non-standard qualities. For example, a user utterance can comprise an incomplete sentence, non-standard abbreviations, slang, grammatical errors, multi-lingual (e.g., have portions in both English and Spanish), contain emojis, single characters, mumbles, background noise, etc. In many embodiments, non-standard qualities can make analysis of user utterances by stock (e.g., pre-trained) natural language processing (NLP) algorithms difficult. For example, many pre-trained NLP algorithms are trained on text that is grammatically correct (e.g., books, news articles, patent applications, etc.) and, therefore, will not recognize patterns involving non-standard qualities. In some embodiments, user utterances can be typed into a text box displayed on a computer system (e.g., system 100 (FIG. 1)) and/or spoken into a microphone. In further embodiments, user utterances can comprise text messages and/or text replies to an automated chat bot and/or virtual assistant. For example, many websites use chat bots to triage customer service issues (e.g., product returns, exchanges, etc.) before forwarding the customer to a customer service specialist. In these or other embodiments, user utterances can be converted into a format that can be interpreted by downstream processes in method 400 (e.g., into a vector representation of the user utterances and/or an embedding representing the utterance). In many embodiments, user utterances and/or their converted representations can be saved in one or more non-transitory storage devices for use in other portions of method 400.

In many embodiments, method 400 can comprise an activity 402 of re-training a pre-trained natural language processing (NLP) algorithm. Generally speaking, a NLP algorithm can comprise one or more predictive algorithms configured to interpret and/or generate human speech. For example, a NLP algorithm can be configured to ingest one or more user utterances (and/or their representations) and output a signal correlated with one or more intents of the utterances. In some embodiments, a NLP algorithm can comprise a machine learning algorithm. A number of different types of machine learning algorithms that analyze user utterances can be used. For example, machine learning algorithms used in method 400 can be at least partially supervised (e.g., use labeled training data) and/or be at least partially unsupervised (e.g., use un-labeled training data). In various embodiments, a machine learning algorithm can comprise one or more transformer algorithms. Generally speaking, a transformer algorithm can be configured to analyze a sequence of inputs instead of un-ordered data. For example, a transformer algorithm can be useful for analyzing biological sequences (e.g., DNA, RNA, proteins, etc.) and/or videos in addition to natural language. In many embodiments, a transformer algorithm can apply an attention system to the machine learning algorithm. Generally speaking, an attention system can be a portion of a machine learning algorithm configured to enhance some portions of an input (e.g., a portion of a user utterance or its representation) while diminishing other portions. In this way, a transformer algorithm can determine what portion of a user utterance is important (e.g., an angry face emoji) while discounting others (e.g., typos).

In some embodiments, training a machine learning algorithm can comprise estimating parameters of a model configured to interpret and/or understand one or more user utterances. In various embodiments, a machine learning algorithm can be trained using labeled training data and/or unlabeled training data, otherwise known as a training dataset. In many embodiments, a training dataset can comprise all or a part of user utterances received in activity 401. In this way, a machine learning algorithm can be configured to interpret and/or understand one or more user utterances by predicting their general intent. In the same or different embodiments, a machine learning algorithm can comprise a transformer-based machine learning algorithm. For example, Bidirectional Encoder Representations from Transformers (BERT) algorithm, etc. In the same or different embodiments, a pre-trained machine learning algorithm (e.g., a BERT algorithm) can be used, and the pre-trained algorithm can be re-trained on the training data. In some embodiments, the machine learning model can also consider both historical and dynamic inputs of user utterances (e.g., user utterances received in activity 401, 404, and/or 406). In this way, a machine learning algorithm can be trained iteratively as data is added to a training data set. In many embodiments, a machine learning algorithm can be iteratively trained in real time as data is added to a training data set. In various embodiments, a machine learning algorithm can be trained, at least in part, on a single user's (e.g., user 340) utterances or the single user's utterances can be weighted in a training data set. In this way, a machine learning algorithm tailored to a single user can be generated. In the same or different embodiments, a machine learning algorithm tailored to a single user can be used as a pre-trained algorithm for a similar user. In several embodiments, due to the large amount of data needed to create and maintain a training data set, a machine learning model can use extensive data inputs to interpret and/or understand one or more user utterances. Due to these extensive data inputs, in many embodiments, creating, training, and/or using a machine learning algorithm configured to interpret and/or understand one or more user utterances cannot practically be performed in a mind of a human being.

In many embodiments, method 400 can comprise an activity 403 of using a re-trained NLP algorithm in a neural network. As an example, the re-trained NLP algorithm can be the pre-trained NLP algorithm that was re-trained in activity 402. In various embodiments, activity 403 can be performed as a part of and/or concurrently with activity 402. Generally speaking, a neural network can comprise a series of algorithms configured to recognize underlying relationships in a set of data through a process that can mimic the way the human brain operates. A neural network can contain layers of interconnected nodes. Each node can be known as perceptron. In many embodiments, a perceptron can feed a signal into an activation function that can be nonlinear. In a multi-layered perceptron, perceptrons can be arranged in interconnected layers. In many embodiments, an input layer collects input patterns. In these or other embodiments, an output layer has classifications and/or output signals to which input patterns can map. In various embodiments, hidden layers can fine-tune input weightings to minimize a neural network's margin of error. In some embodiments, a NLP algorithm can be used as a layer and/or one or more nodes in a neural network. For example, a BERT algorithm can be used in a neural network as a layer and/or a node.

Neural networks can generally be classified by their structure and/or function. For example, a neural network can comprise a hierarchical multi-label classification network (HMCN). In various embodiments, a HMCN can be configured to solve one or more hierarchical multi-label classification problems. Generally speaking, objects to be classified by classification algorithms (e.g., user utterances and/or their representations) can belong to more than one class in what can be referred to as multi-label classification problem. Moreover, there are other cases in which a set of classes can be organized in a hierarchical fashion (e.g., in a class and sub class of intents), and an object (e.g., user utterances and/or their representations) can be associated to a single path in this hierarchy. This situation can be referred to as a hierarchical classification problem. Further, in even more complex scenarios, classes can be organized in a hierarchical structure and an object can be associated to multiple paths of this hierarchy. For example, a user utterance can be classified as "Where is my order" and "missing items." As another example, a user utterance can be classified as "Return"→"missing items." In these embodiments, "Where is my order" and "Return" can be level 1 intents and "missing items" can be a level 2 intent. These situations can be referred to as hierarchical multi-label classification problems.

In many embodiments, a HMCN can comprise a multiple-output deep neural network. In many embodiments, a HMCN can perform both local and global optimization in hierarchical multi-label classification problems (e.g., text classification). In various embodiments, HMCN can propagate gradients from multiple network outputs. In various embodiments, a HMCN can be configured to classify a user utterance into at least two level hierarchical categorization. For example, the HMCN can classify a user utterance first as directed to a customer service domain and then to a damaged item species. In further embodiments, a HMCN can comprise one local output per hierarchical level and/or a local loss function used for back-propagating. More information about HMCNs can be found in J. Wehrmann et al., Hierarchical Multi-Label Classification Networks, Proceedings of the 35th International Conference on Machine Learning (2018), which is herein incorporated by this reference in its entirety. HMCNs themselves can also be classified by their structure and connections between nodes in the network. For example, a HMCN can be structured as a feed-forward neural network, a recurrent neural network, and/or a chained neural network. In various embodiments, a feed-forward neural network can comprise a neural network where connections between nodes do not form a cycle. In these or other embodiments, a recurrent neural network can comprise a neural network where connections between nodes form a directed or undirected graph along a temporal sequence. In further embodiments, a chained neural network can predictions of previously trained networks into a training process of new networks, forming a chain-like ensemble. In many embodiments, a HMCN can comprise a hybrid neural network comprising one or more layers from each to the above referenced types.

Figure 5:
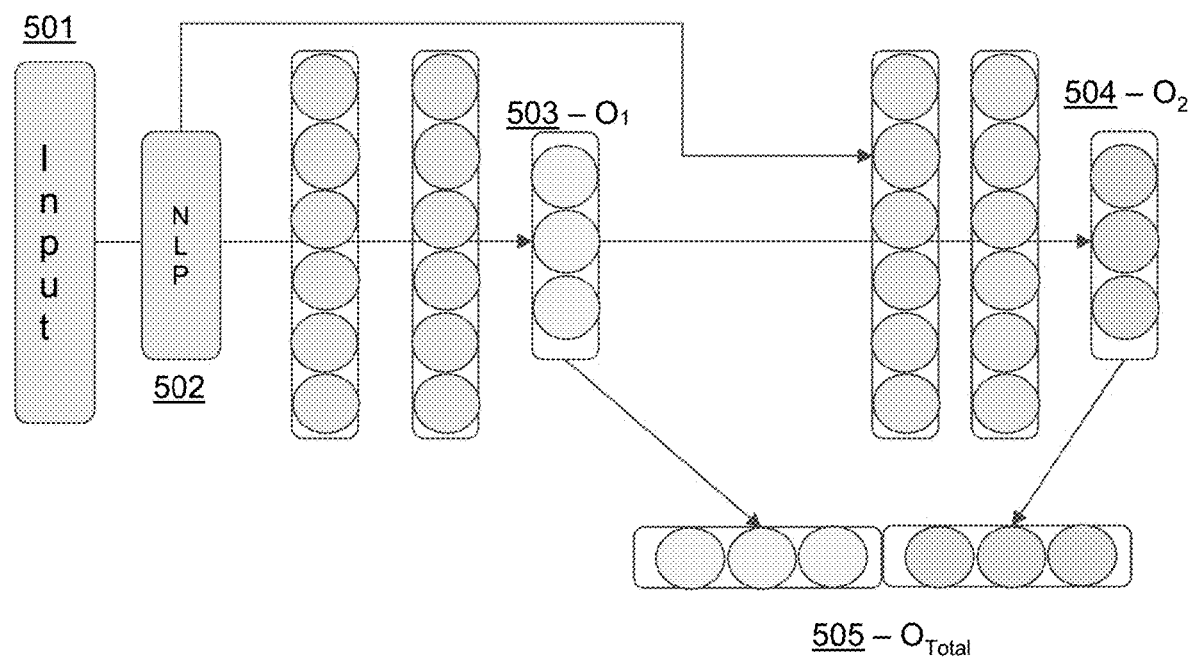
FIG. 5 shows a representative block diagram of a neural network, according to some embodiments.

Turning ahead in the drawings, FIG. 5 shows a representative block diagram of a neural network 500. In many embodiments, neural network 500 can be configured to interpret one or more user utterances as received in activity 401 (FIG. 4). In various embodiments, neural network 500 can comprise one or more of input 501, NLP algorithm 502, output-1 (i.e., $O_1$) 503, output-2 (i.e., $O_2$) 504, and/or total output ($O_{Total}$) 505. In some embodiments, input 501 can comprise one or more user utterances. In some embodiments, unlabeled layers in neural network 500 can comprise one or more linear layers and/or hidden layers. In various embodiments, NLP algorithm 502 can comprise a pre-trained NLP algorithm (either re-trained or not), as described in activities 402-403 (FIG. 4). In various embodiments, NLP algorithm 502 can comprise other types of neural networks. For example, NLP 502 can comprise one or more of a recurrent neural network, a convolutional neural network, ect. As shown in FIG. 5, input 501 is used to determine $O_1$ 503. In the same or different embodiments, $O_1$ 503 and input 501 can be used to determine $O_2$ 504. Furthermore, in the same or different embodiments, $O_1$ 503 and $O_2$ 504 can be combined to form total output 505. In many embodiments, an output of NLP algorithm 502 can be passed into multiple different linear and/or hidden layers. In some embodiments, an output of one or more linear and/or hidden layers can be combined with an output of NLP algorithm 502 to create $O_1$ 503. In various embodiments, an output of one or more linear and/or hidden layers can be combined with an output of $O_1$ 503 to create $O_1$ 502. In some embodiments, one or more loss functions calculated by all or a part of neural network 500 can be minimized. For example, loss can be minimized locally using cross-entropy and minimized globally using mean squared error (MSE) loss.

Returning now to FIG. 4, in some embodiments, method 400 can optionally comprise activity 404 of receiving a new user utterance. In these or other embodiments, a new user utterance can be received from the same or different source as in activities 401 and/or 406. In various embodiments, a new user utterance can be related to a user utterance received in activity 401 (e.g., be a response or add additional details). In further embodiments, a new user utterance can be a response to a chatbot or a virtual assistant. In many embodiments, a new user utterance can be unrelated to a user utterance received in activity 401.

In many embodiments, method 400 can comprise an activity 405 of combining a first output of a first layer with a second output of a second layer. In some embodiments, activity 405 can be performed as a part of and/or concurrently with activity 403. In many embodiments, a layer can comprise one or more layers of a neural network (e.g., neural network 500 (FIG. 5)). In further embodiments, a first output of a first layer can be different than a second output of a second layer. In some embodiments combining two or more outputs can comprise adding together one or more loss functions and/or values output by a neural network. Generally speaking, a loss function (sometimes referred to as a cost function) can comprise a function that maps an event or values of one or more variables onto a real number. In many embodiments, this real number can represent some type of "cost" associated with an event. In various embodiments, a classification and/or sub-classification for a user utterance can comprise a classification and/or sub-classification with a lowest (e.g., minimized) loss.

A neural network can have a number of different outputs that can be considered in activity 405. Turning back to FIG. 5, a number of previously mentioned outputs can be seen. For example, $O_1$ 503, $O_2$ 504, and/or $O_{Total}$ 505 can all be used in activity 405 (FIG. 4) as an output of a neural network. In many embodiments, $O_1$ 503 and/or $O_2$ 504 can be referred to as a cross entropy loss. Generally speaking, cross-entropy loss (sometimes referred to as log loss) measures a performance of a classification model whose output is a probability value that can be between 0 and 1. In some embodiments, cross-entropy loss increases as a predicted probability diverges from an actual label. In many embodiments, $O_1$ 503 and $O_2$ 504 can be different from one another. In these or other embodiments, $O_1$ 503 and $O_2$ 504 can be the same. In various embodiments, $O_{Total}$ 505 can be referred to as mean squared error. Generally speaking, mean squared error (sometimes referred to as MSE loss) can comprise an average of the squares of the errors. In other words, MSE loss can comprise an average squared difference between an estimated values and an actual value. In various embodiments, one or more of $O_1$ 503 and/or $O_2$ 504 can be combined to create $O_{Total}$ 505. In many embodiments, $O_{Total}$ 505 can be calculated as a weighted sum of $O_1$ 503 and/or $O_2$ 504. In some embodiments, one or more of $O_1$ 503, $O_2$ 504, and/or $O_{Total}$ 505 can be combined to create a total loss for a neural network. In many embodiments, $O_1$ 503, $O_2$ 504, and/or $O_{Total}$ 505 can be added together to determine a total loss for a neural network. In various embodiments, a value for a total loss can be correlated with an intent of a user utterance. For example, a total loss of a neural network can be correlated with an intent to return, exchange, or get a refund for a previously purchased item. Data and therefore signals can travel through neural network 500 in a number of different ways. In many embodiments, NLP 502 can feed into two different layers. In some embodiments, an NLP can feed into a first output layer and a second output layer via different pathways. For example, NLP 502 feeds into a layer that generates $O_1$ 503 and $O_2$ 504 through two different pathways.

In some embodiments, method 400 can optionally comprise activity 406 of receiving a new user utterance. In many embodiments, activity 406 can be similar to activity 404.

In many embodiments, method 400 can comprise an activity 407 of coordinating displaying a customized GUI. In many embodiments, activity 407 can be performed in response to one or more of activities 401-406. In some embodiments, a customized GUI can comprise a GUI configured to respond to an intent detected in activity 405. In further embodiments, a customized GUI can be generated using one or more outputs of a machine learning algorithm (e.g., $O_1$ 503 (FIG. 5), $O_2$ 504 (FIG. 5), and/or $O_{Total}$ 505 (FIG. 5)) and/or a total loss for a machine learning algorithm. In many embodiments, a customized GUI can be displayed on or as a part of GUI 350-351 (FIG. 3). In some embodiments, generating a customized GUI can comprise responding to one or more text and or voice inputs into a chatbot and/or virtual assistant. For example, if a user utterance contains an intent to return an item, then a customized GUI can comprise can respond with options for a cash refund or store credit.

Figure 6:
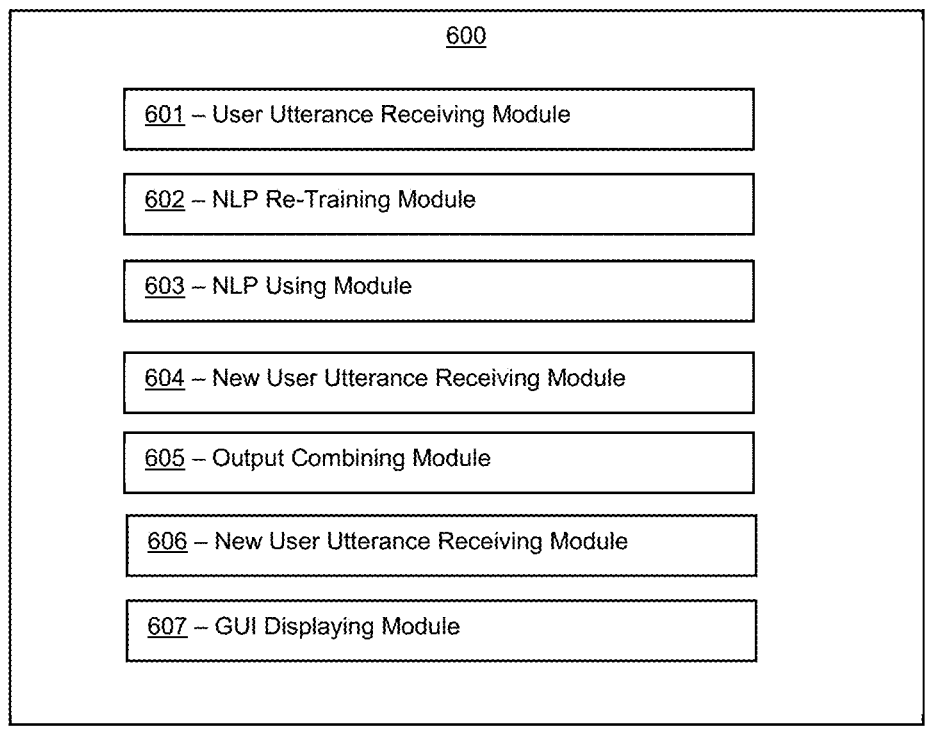
FIG. 6 illustrates a representative block diagram of a system, according to an additional embodiment.

Turning ahead in the drawings, FIG. 6 illustrates a block diagram of a system 600 that can be employed for behavior based messaging. System 600 is merely exemplary and embodiments of the system are not limited to the embodiments presented herein. System 600 can be employed in many different embodiments or examples not specifically depicted or described herein. In some embodiments, certain elements or modules of system 600 can perform various procedures, processes, and/or activities. In these or other embodiments, the procedures, processes, and/or activities can be performed by other suitable elements or modules of system 600. In one embodiment, system 600 is a portion of web server 310 (FIG. 3). In another embodiment, system 600 is a separate system from web server 310 (FIG. 3) and is coupled to web server 310 (FIG. 3). As an example, system 600 can be coupled to web server 310 (FIG. 3) via Internet 320 (FIG. 3).

Generally, therefore, system 600 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 600 described herein.

In many embodiments, system 600 can comprise non-transitory memory storage module 601. Memory storage module 601 can be referred to as user utterance receiving module 601. In many embodiments, user utterance receiving module 601 can store computing instructions configured to run on one or more processing modules and perform one or more acts of method 400 (FIG. 4) (e.g., activity 401 (FIG. 4)).

In many embodiments, system 600 can comprise non-transitory memory storage module 602. Memory storage module 602 can be referred to as NLP re-training module 602. In many embodiments, NLP re-training module 602 can store computing instructions configured to run on one or more processing modules and perform one or more acts of method 400 (FIG. 4) (e.g., activity 402 (FIG. 4)).

In many embodiments, system 600 can comprise non-transitory memory storage module 603. Memory storage module 603 can be referred to as NLP using module 603. In many embodiments, NLP using module 603 can store computing instructions configured to run on one or more processing modules and perform one or more acts of method 400 (FIG. 4) (e.g., activity 403 (FIG. 4)).

In many embodiments, system 600 can comprise non-transitory memory storage module 604. Memory storage module 604 can be referred to as new user utterance receiving module 604. In many embodiments, new user utterance receiving module 604 can store computing instructions configured to run on one or more processing modules and perform one or more acts of method 400 (FIG. 4) (e.g., activity 404 (FIG. 4)).

In many embodiments, system 600 can comprise non-transitory memory storage module 605. Memory storage module 605 can be referred to as output combining module 605. In many embodiments, output combining module 605 can store computing instructions configured to run on one or more processing modules and perform one or more acts of method 400 (FIG. 4) (e.g., activity 405 (FIG. 4)).

In many embodiments, system 600 can comprise non-transitory memory storage module 606. Memory storage module 606 can be referred to as new user utterance receiving module 606. In many embodiments, new user utterance receiving module 606 can store computing instructions configured to run on one or more processing modules and perform one or more acts of method 400 (FIG. 4) (e.g., activity 406 (FIG. 4)).

In many embodiments, system 600 can comprise non-transitory memory storage module 607. Memory storage module 607 can be referred to as GUI displaying module 607. In many embodiments, GUI displaying module 607 can store computing instructions configured to run on one or more processing modules and perform one or more acts of method 400 (FIG. 4) (e.g., activity 407 (FIG. 4)).

Although systems and methods for generating a customized GUI have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable storage devices storing computing instructions configured to run on the one or more processors and cause the one or more processors to perform:
receiving one or more user utterances;
re-training a pre-trained natural language processing (NLP) algorithm on the one or more user utterances;
using the pre-trained NLP algorithm, as re-trained, as one or more layers in a neural network;
combining at least one first output of at least one first output layer of the neural network with at least one second output of at least one second output layer of the neural network to create a final output of the neural network, wherein:
the at least one first output layer of the neural network is different than the at least one second output layer of the neural network; and
wherein the pre-trained NLP algorithm, as re-trained, is used to determine the final output of the neural network; and
coordinating displaying a customized graphical user interface (GUI) using the final output of the neural network.

2. The system of claim 1, wherein the customized GUI comprises a reply from a chat bot.

3. The system of claim 1, wherein the one or more user utterances comprise messages entered into a chat bot.

4. The system of claim 1, wherein the pre-trained NLP algorithm, as re-trained and used in the neural network, feeds into:
the first output layer of the neural network and the second output layer of the neural network through two different pathways.

5. The system of claim 1, wherein:
the at least one first output of the at least one first output layer comprises a first cross entropy loss;
the at least one second output of the at least one second output layer comprises a second cross entropy loss; and
the final output of the neural network comprises mean squared error.

6. The system of claim 1, wherein:
the computing instructions are further configured to run on the one or more processors and cause the one or more processors to perform:
after using the pre-trained NLP algorithm, as re-trained, as one or more layers in the neural network, receiving a new user utterance from a user; and
the final output of the neural network is correlated with an intent of the new user utterance.

7. The system of claim 1, wherein the neural network comprises a hybrid neural network comprising at least a portion of two different types of hierarchical multi-label classification networks.

8. The system of claim 1, wherein the neural network comprises a hybrid neural network comprising at least one chained portion and at least one unchained portion.

9. The system of claim 1, wherein the one or more user utterances comprise requests to return, exchange, or refund one or more items.

10. The system of claim 1, wherein coordinating displaying the customized GUI using the final output of the neural network comprises:
 calculating a total loss using the at least one first output of the at least one first output layer, the at least one second output of the at least one second output layer, and the final output of the neural network; and
 coordinating displaying the customized GUI using the total loss.

11. A method implemented via execution of computing instructions configured to run at one or more processors and configured to be stored at non-transitory computer-readable media, the method comprising:
 receiving one or more user utterances;
 re-training a pre-trained natural language processing (NLP) algorithm on the one or more user utterances;
 using the pre-trained NLP algorithm, as re-trained, as one or more layers in a neural network;
 combining at least one first output of at least one first output layer of the neural network with at least one second output of at least one second output layer of the neural network to create a final output of the neural network, wherein:
  the at least one first output layer of the neural network is different than the at least one second output layer of the neural network; and
  wherein the pre-trained NLP algorithm, as re-trained, is used to determine the final output of the neural network; and
 coordinating displaying a customized graphical user interface (GUI) using the final output of the neural network.

12. The method of claim 11, wherein the customized GUI comprises a reply from a chat bot.

13. The method of claim 11, wherein the one or more user utterances comprise messages entered into a chat bot.

14. The method of claim 11, wherein the pre-trained NLP algorithm, as re-trained and used in the neural network, feeds into:
 the first output layer of the neural network and the second output layer of the neural network through two different pathways.

15. The method of claim 11, wherein:
 the at least one first output of the at least one first output layer comprises a first cross entropy loss;
 the at least one second output of the at least one second output layer comprises a second cross entropy loss; and
 the final output of the neural network comprises mean squared error.

16. The method of claim 11, wherein:
 the method further comprises:
  after using the pre-trained NLP algorithm, as re-trained, as one or more layers in the neural network, receiving a new user utterance from a user; and
 the final output of the neural network is correlated with an intent of the new user utterance.

17. The method of claim 11, wherein the neural network comprises a hybrid neural network comprising at least a portion of two different types of hierarchical multi-label classification networks.

18. The method of claim 11, wherein the neural network comprises a hybrid neural network comprising at least one chained portion and at least one unchained portion.

19. The method of claim 11, wherein the one or more user utterances comprise requests to return, exchange, or refund one or more items.

20. The method of claim 11, wherein coordinating displaying the customized GUI using the final output of the neural network comprises:
 calculating a total loss using the at least one first output of the at least one first output layer, the at least one second output of the at least one second output layer, and the final output of the neural network; and
 coordinating displaying the customized GUI using the total loss.

* * * * *